United States Patent [19]

Munsey

[11] 4,068,569

[45] Jan. 17, 1978

[54] ROTARY TOASTER DEVICE

[76] Inventor: George B. Munsey, Box 4285 Asher Ave., Little Rock, Ark. 72204

[21] Appl. No.: 765,704

[22] Filed: Feb. 4, 1977

[51] Int. Cl.² ............................................. A47J 37/08
[52] U.S. Cl. ...................................... 99/327; 99/335; 99/355; 99/391; 99/443 C; 99/448
[58] Field of Search .................. 99/326, 327, 329 RT, 99/334, 335, 390, 391, 393, 389, 386, 355, 423, 443 C, 443 R, 448, 449, 450

[56] References Cited

U.S. PATENT DOCUMENTS

| | | | |
|---|---|---|---|
| 1,809,112 | 6/1931 | Criner | 99/327 |
| 2,168,773 | 8/1939 | Parr | 99/423 |
| 2,171,510 | 8/1939 | Stirgwolt | 99/327 |
| 2,920,177 | 1/1960 | Brane | 99/391 |
| 3,204,549 | 9/1965 | Palowsky | 99/391 |
| 3,277,813 | 10/1966 | Luscher | 99/386 |

Primary Examiner—Billy J. Wilhite

[57] ABSTRACT

A toaster device has a support grid mounted for rotation about a vertical axis between heating elements disposed on opposite sides thereof. Grid elements are mounted for pivotal movement on opposite edges of the support, and depending finger elements on the grids slidingly move along an inner side of a rod member on the toaster throughout a segment of rotation of the support for raising the grid elements so that toasted items located thereon are delivered outwardly of the toaster. The depending finger elements move to the outer side of the rod upon continued rotation of the support grid so as to cause the grid elements to move back into their horizontal positions.

8 Claims, 5 Drawing Figures

ROTARY TOASTER DEVICE

BACKGROUND OF THE INVENTION

Toasters of various designs are presently available and include pop-up types, endless chain moving types, front door opening types, etc. In many instances, however, the toastable items have a tendency to jam while in the process of popping up and while moving along the endless conveyor, and the lock and release mechanisms required for the pop-up and open door types sometimes fail to properly function because of worn or unadjusted parts. Moreover, most toasters are ill-equipped for receiving toastable items having spreads on one or both sides without contaminating the heating resistance elements or other portions of the toaster.

Rotary toasters are likewise known as including a horizontal grid rotatable about a vertical axis between heating elements located on opposite sides of the grid. One of such devices is disclosed in U.S. Pat. No. 3,277,813, except that removal of the toasted items is normally done by manually lifting them off the grid after toasting. This is not only inconvenient but may present a safety hazard because of the close proximity of the heating elements to that portion of the grid which extends outwardly of the front opening of the toaster.

SUMMARY OF THE INVENTION

A toaster has been devised in accordance with the invention to avoid the difficulties experienced with many prior art toasters, and it is an object of the invention to provide a toaster of the rotary grid type which avoids the need for any lock and release means as required for other types of toasters, and which permits the toasting of items having spreads on one or both sides without the chance of contaminating the heating elements or other portions of the toaster. Another object is to provide such a toaster device wherein the toasted items are automatically delivered outwardly of the toaster upon completion of the toasting operation, in a simple and economic yet highly effective manner.

The toaster device according to the invention includes a casing having spaced horizontal walls and an opening at the front thereof with a shaft extending vertically in the casing. A support grid is mounted on the casing for rotation therewith and at least one grid element is mounted on the support for pivotal movement between a horizontal and raised position. A depending finger element on the grid slides along an inner side of a rod member mounted on the casing at the front opening, contact between the finger element and the rod taking place throughout a segment of rotation of the support to thereby effect a raising of the grid. A toastable item on the grid is therefore delivered outwardly of the front opening after it has been toasted when disposed between the heating elements. And, upon further rotation of the support, the finger element moves to the outer side of the rod so as to effect lowering of the grid back to its horizontal position. A motor is provided for rotating the shaft so that the grid in its horizontal position stops between the heating elements for toasting, with rotation being continued for delivering the toasted item outwardly of the front opening as described.

DETAILED DESCRIPTION OF THE INVENTION

Figure 1:
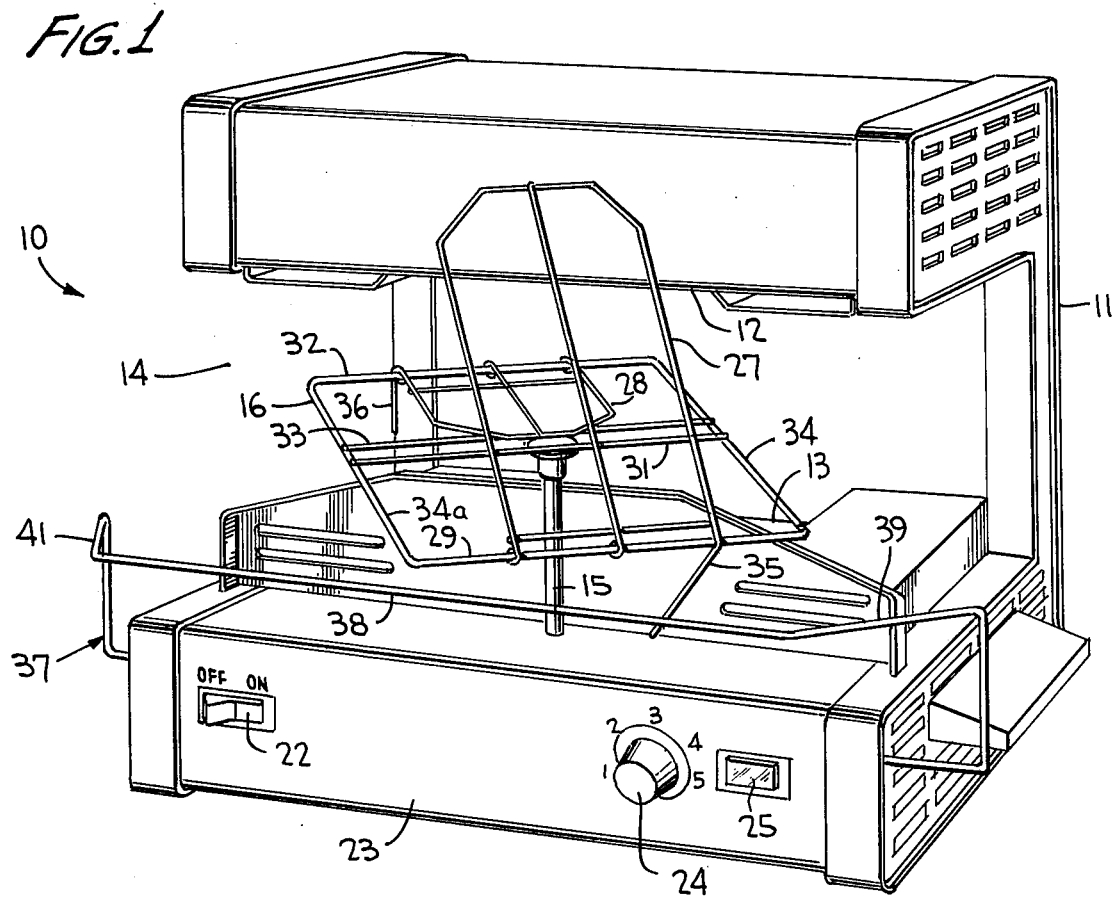
FIG. 1 is a perspective view of the toaster device in accordance with the invention.
Figure 2:
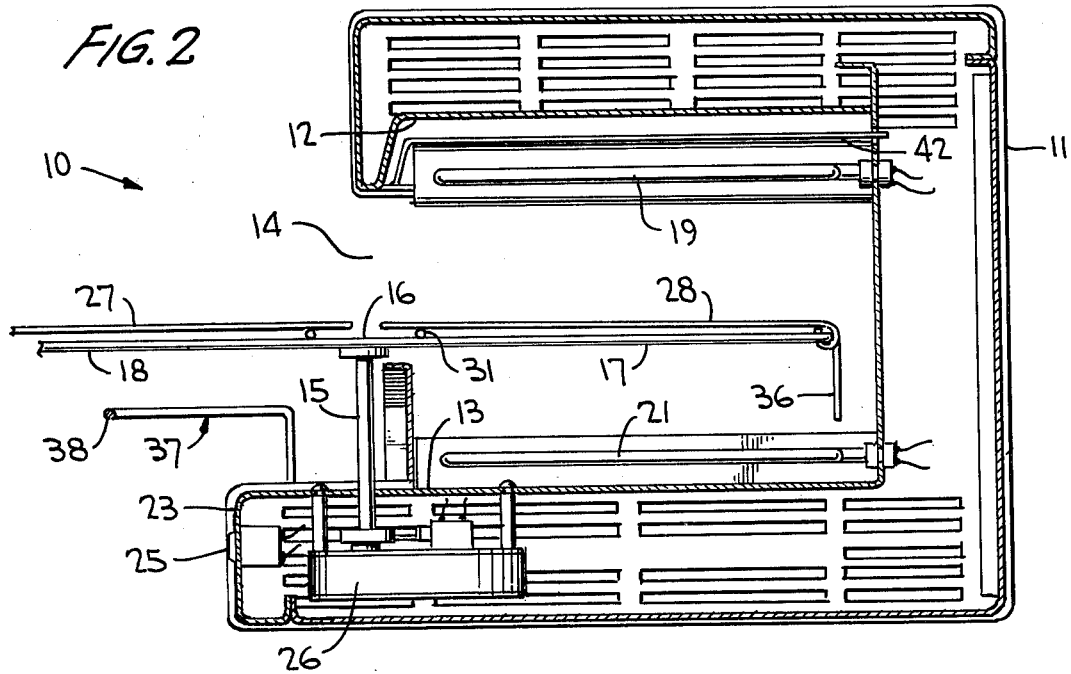
FIG. 2 is a vertical cross-sectional view taken through the device of FIG. 1.

Turning now to the drawings wherein like reference characters refer to like and corresponding parts throughout the several views, the toaster device is generally shown at 10 in FIGS. 1 and 2 as comprising a casing 11 having spaced horizontal walls 12 and 13 defining a front opening 14 of the device. A vertical shaft 15 extends through the casing and is located substantially at front opening 14 as shown in FIG. 2. A substantially rectangular support grid 16 is connected to the upper end of the shaft substantially at the center of the support. A portion 17 of the support grid is therefore capable of lying wholly between walls 12 and 13 inside front opening 14, while a remaining portion 18 of the support grid is capable of lying wholly outwardly of front opening 14, as shown in FIG. 2.

Heating elements 19 and 21, which may each comprise electric resistance heat (cal) rods similar to the type found in most household electric cooking ovens, are mounted on a portion of the casing and extend horizontally on opposite sides of the support grid and parallel to the upper and lower walls. These elements are controlled in any normal manner as by a typical on-off switch 22 operatively mounted on a lower front wall 23 of the toaster, with the heating elements being further controlled by a rotary timing switch 24 which regulates the electric power to rods 19 and 21 between "low", "medium" and "high" heating conditions. A signal lamp 25 is also provided on front wall 23 indicating an "on" condition of the heating elements.

Shaft 15 is rotatable about its central axis by means of a conventional electric motor 26 disposed behind front wall 23 of the toaster. The motor includes a clutch mechanism and is actuated by switch 22 so that portion 17 of the support grid may be rotated into its position of FIG. 2 wholly located between the heating elements and stopped in this position for a predetermined time. The support grid is thereafter caused to continue its rotation until portion 17 lies wholly outwardly of front opening 14 and portion 18 of the support grid lies wholly between the heating elements and is stopped in that position for a corresponding predetermined period of time.

Figure 3:
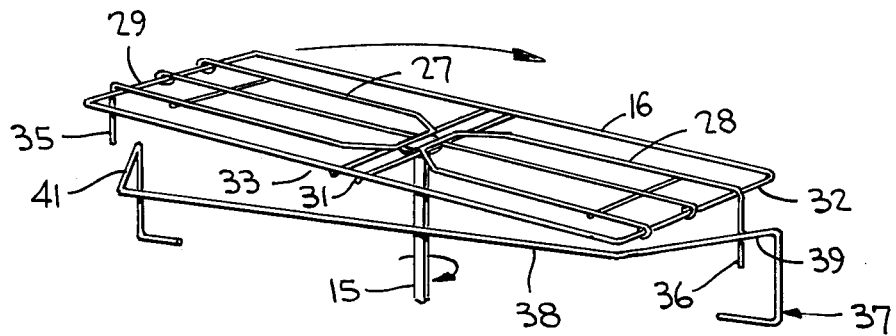
FIGS. 3, 4 and 5 are perspective views of the support grid and a pair of pivotal grid elements connected thereto and showing a complete cycle of rotation during which a grid element is raised for delivering the toasted item outwardly of the toaster.
Figure 4:
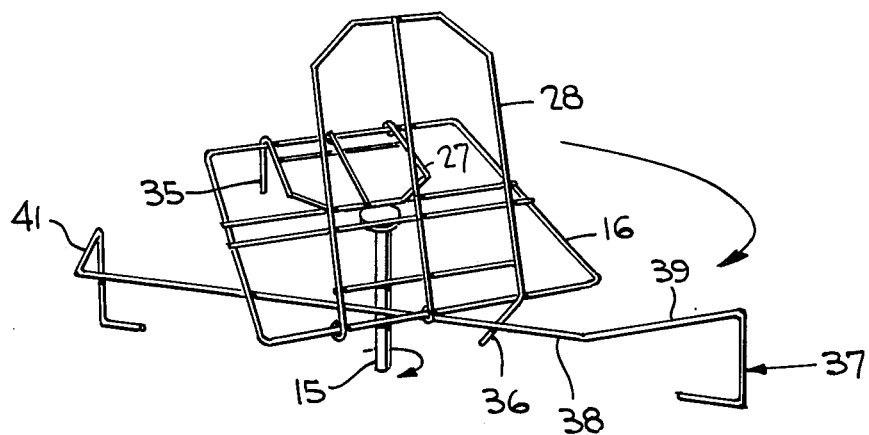
Figure 5:
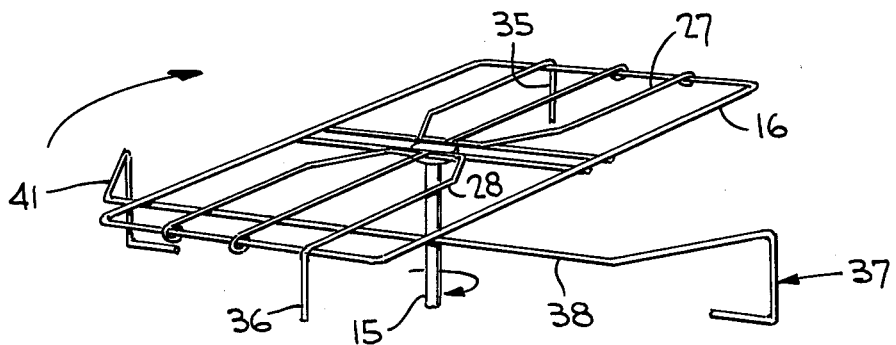

Grid elements 27 and 28 are connected to support grid 16 for pivotal movement from their horizontal positions of FIGS. 2, 3 and 5 to raised positions shown for grid element 27 in FIGS. 1 and 4. Grid element 27 is pivotally connected to a short side edge 29 of the support grid and extends toward the center thereof so as to rest against a transverse grid rod 31 when in its horizontal position. And, grid element 28 is pivotally connected to an opposite short side edge 32 of the support grid and extends toward the center thereof so as to rest against a transverse grid rod 33 thereof when in a horizontal position of FIGS. 2, 3 and 5. Both the grid elements are disposed substantially centrally between opposing long side edges 34 and 34a of the support grid, and they respectively include depending integral finger elements 35 and 36 which depend from side edges 29 and 32.

Finger element 35 is offset from the center of grid 27 so as to lie closer to side edge 34, and finger element 36 is offset from grid 28 so as to lie closer to an opposite side edge 34a of the support grid. These finger elements are provided for moving their respective grid elements from their horizontal to their raised positions about their respective pivotal connections with the support grid.

A rod member 37 is mounted on the casing and has an elongated portion 38 lying substantially parallel to the front opening of the toaster and slightly outwardly thereof in the path of movement of fingers 35 and 36 during rotation of the support grid. Rod member 37 also includes portions 39 and 41 integrally connected at opposite ends of portion 38 and inclined inwardly toward front opening 14 of the toaster. And, it should be pointed out that each depending finger 35 and 36 is of such a predetermined length and rod member 37 is located in sufficient proximity to front opening 14 whereby sliding contact is assured between each finger and rod 37 during a segment of rotation of the support grid.

In operation, an item to be toasted, such as a piece of bread, a muffin or the like, may be placed on grid element 27 while it extends outwardly of the front opening as shown in FIG. 2. Motor 26 is then actuated for rotating the support grid and the connected grid elements in the direction of the arrows shown in FIG. 3, with the timer being set for the desired degree of toasting of the item. When grid element 27 is rotated into a position wholly between the heating elements shown in FIG. 2 (as shown occupied by grid element 28), rotation of shaft 15 is stopped by the clutch or some equivalent means coupled with the motor so that the toastable item is toasted on both sides to the desired degree.

During such rotation, finger 36 on grid 28 will have contacted an inner side of portion 39 of rod 37 as shown in FIG. 3 and will continue to slide therealong as well as along a segment of portion 38 of the rod (see FIG. 4) thereby causing grid element 28 to which it is connected to be moved about the pivotal connection of this grid from its horizontal position of FIG. 3 to its raised or inclined position of FIG. 4. Such movement is effected as finger 36 is moved inwardly of support 16 while grid 28 is moved correspondingly outwardly. And, upon continued rotation of the shaft, finger element 36 is moved (by reason of its length relative to the proximity of rod 37) over the top of rod portion 38 so as to lie on the outer side thereof whereupon grid 28 is moved by gravity back to its horizontal position as shown in FIG. 5. It can be therefore seen that any toastable item which would have been placed on grid 28 would have been delivered outwardly of the front opening of the toaster during this raising motion of grid element 28 throughout the segment of rotation as aforedescribed while finger 36 was in sliding contact with rod 37.

After grid element 28 has moved back to its horizontal position of FIG. 5, a toastable item is placed thereon while the support grid is stopped in this position and the item placed on grid 27 is now in the process of being toasted on both sides. Continued rotation of the support grid and the connected grid elements will cause finger element 35 to slide along an inner side of portions 39 and 38 of the rod 37 in the same manner as described above with reference to grid element 28. The toasted item on grid 27 is therefore delivered outwardly of the front opening and the cycle repeats itself as aforedescribed. It should be pointed out that, by reason of the finger elements lying closer to their respective side edges 34 and 34a of the support grid, they are caused to respectively clear portions 39 and 41 of rod 37 when rotated into the position of FIG. 3. Rod 37 is designed symmetrically for ease in manufacture and to provide a neater appearance.

It should be also pointed out that the timer mechanism 24 is of the solid state variety having a variable control capability, and the rack comprising grid 16, elements 27, 28 and shaft 15 is removable together with shaft 15 for easy cleaning. Also, a top reflector plate 42 of polished metal is likewise removable for easy cleaning.

From the foregoing it can be seen that the toaster arrangement of the present invention includes an automatic unloading feature which delivers the toasted items outwardly of the front opening of the toaster in a manner requiring a minimum of moving parts and in a manner which is reliable, dependable and economical.

Obviously, many modifications and variations of the invention are made possible in the light of the above teachings. It is therefore to be understood that within the scope of the appended claims the invention may be practiced otherwise than as specifically described.

What is claimed is:

1. A toaster device comprising, a casing having spaced horizontal walls and an opening at the front thereof, a rotatable shaft extending vertically in said casing, a horizontal support grid mounted on said shaft between said walls, means for rotating said shaft and said support grid about the central axis of said shaft, heating elements disposed horizontally on opposite sides of said support grid, at least one grid element for supporting a toastable item, said element resting on said support grid and being pivotally connected thereto for movement between a horizontal position and a raised position, means extending outwardly of said grid element for moving same to said raised position, and said casing including abutment means disposed for contact by said outwardly extending means throughout one segment of rotation of said support grid, said abutment means being located at said front opening, whereby upon support grid rotation about said axis said grid element is caused to be moved from said horizontal position to said raised position for delivering the toastable item outwardly of said casing through said front opening.

2. The device according to claim 1, wherein said grid element is pivotally connected to one edge of said support grid, and said outwardly extending means comprises a finger element depending from said one edge.

3. The device according to claim 2, wherein said abutment means comprises a rod member extending along said front opening, said finger element sliding along one side of said rod member throughout said segment of rotation, and said finger element having a predetermined length such that said finger element moves from said one side to an opposite side of said rod member upon continued rotation of said support grid, whereby said grid element is caused to be moved back to said horizontal position.

4. The device according to claim 2, further including another said grid element for supporting another toastable item resting on said support grid and being pivotally connected thereto for movement between a horizontal position and a raised position, said another grid element being pivotally connected to an edge of said support grid opposite said one edge and extending toward said center, means extending outwardly of said another grid element for moving same to its raised position when in contact with said abutment means throughout another segment of rotation of said support grid, whereby upon rotation of said support grid said grid elements are alternatively caused to be moved from their horizontal positions to their raised positions for delivering the toastable items outwardly of said casing through said front opening.

5. The device according to claim 4, wherein said outwardly extending means on said another grid element comprises a finger element depending from said opposite edge, and said abutment means comprises a rod member extending along said front opening.

6. The device according to claim 5, wherein said finger element on said another grid element slides along one side of said rod member throughout said another segment of rotation and has a predetermined length permitting it to move from said one side to an opposite side of said rod member upon continued rotation of said support grid, whereby said another grid element is caused to be moved back to its horizontal position.

7. The device according to claim 6, wherein said means for rotating said shaft comprises a motor capable of rotating one of said grid elements into position between said heating elements and of stopping for a predetermined amount of time at said position and of rotating the other of said grid elements into position between said heating elements and for stopping for a predetermined amount of time, and so on throughout continued rotation, and timing means provided for controlling said heating elements.

8. The device according to claim 1, wherein said shaft is disposed substantially at said front opening, said grid support being mounted at the center thereof to said shaft, whereby a portion of said grid support extends between said walls and a remaining portion of said grid support extends outwardly of said front opening.

* * * * *